United States Patent Office 3,429,915
Patented Feb. 25, 1969

3,429,915
CYANAMIDE AMINO ACID
CHELATING AGENTS
Frederick C. Bersworth, 120 Washington St.,
East Orange, N.J. 07017
No Drawing. Continuation-in-part of application Ser. No. 580,829, Sept. 20, 1966. This application Oct. 10, 1967, Ser. No. 674,125
U.S. Cl. 260—534     6 Claims
Int. Cl. C07c 101/26, 103/18

ABSTRACT OF THE DISCLOSURE

Products formed by reacting cyanamide, dicyandiamide and its hydrolysis products, with carboxymethylated amino acids, such as imino diacetic acids and those imino diacetic acids and variants thereof known as polyamino polycarboxylic amino acids chelating agents, are found to be exceptionally good chelating agents for heavy and transition metals.

RELATED APPLICATION

This application is a continuation-in-part of my application Ser. No. 580,829, now U.S. Patent 3,351,658, issued Nov. 7, 1967 and Ser. No. 588,224, both filed Sept. 20, 1966, a continuation of Ser. No. 468,182, filed June 4, 1965, which applications in turn, are continuations-in-part of prior filed applications, Ser. Nos. 88,604 and 88,606, filed Feb. 13, 1961, all said precursor applications being fully incorporated herein, under 35 U.S.C. 120.

BACKGROUND OF THE INVENTION

The usefulness of chelating compounds as a class is well established. The compounds are water soluble and provide means to soften water, for treating solutions, and, generally, chemically react with heavy metal ions in purification operations, metal recovery operations, equipment cleaning operations, laundry, and particularly, in agricultural activity to put trace metals into soil in soluble form, or to add the chelating agents to soil, as such, thereby solubilizing trace metals present in the soils as oxides. In other words, wherever a chemical or natural phenomenon occurs the chelation reaction of the chelating moiety can find its use.

An object of the present invention is to provide chelating moieties using hydrogen-nitrogen compounds which can be considered fertilizing agents, or fertilizer precursors, which, upon decomposition in soil will give ammonia.

It is another object of the invention to provide agents of solubility and substantivity toward iron, such that they will find great usefulness in washing and detergent operations.

Furthermore, the instant compositions are directed to providing modifications of the moieties such that the material can be used as surface active agents, which include the chelating function along with the surface activity through the attachment of a long chain group directly to nitrogen, together with hydrophyllic compositions, so that surfactant and chelating functions can be present together in the same solution, if not actually in the same molecule.

Other objects and advantages of the invention will in part be obvious and in part appear hereinafter.

DETAILED DESCRIPTION OF THE INVENTION

The capability of the acid-amino nitrogen combination, particularly the —CONHX$_2$, X being NH$_2$, or NCNH, e.g. CONHNH$_2$ and variants thereof, to form proton donor groups effective at highly alkaline pH is an unusual phenomenon in chemistry, because such groups are generally considered to be substituted imino groups followed by a negative radical. In accordance with this invention, I form a unique set of such groups by the reaction of cyanamide, dicyandiamide and variants of cyanamide, with the polyamino polycarboxylic acid chelating agents in the following fashion:

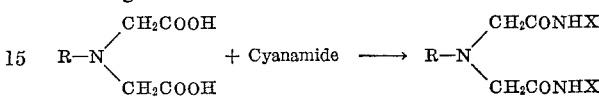

as the reaction product.

Cyanamide is a well known, quantitatively identified compound readily available in high degrees of purity. It answers to the formula NH$_2$CN, or dicyandiamide, $$NH_2CNH_2NCN$$

The amino acids of polycarboxylic acid compounds reactable with the cyanamide and its variants may be defined as follows:

wherein R is hydrogen, or

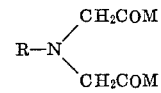

$m = 0-4$
$o = 0, 1$
$n = 2, 3$ and COM is independently selected from the group consisting of —COOH,— COONa, —COOK, —COONH$_4$ and —COO alkyl, not more than two COM's being —CH$_2$OH so that the starting acid compound has at least two moieties which can be available for reaction with the cyanamide.

Rrepresentative compounds coming within this class are imino diacetic acid, digylcine, 2 hydroxyethyl nitrilo diacetic acid, nitrilo triacetic acid, ethylenediaminetetraacetic acid, diethylenetriaminepentaacetic acid, and the hydroxyethyl variants of these acid compounds having over two acetic acid moieties, wherein one or two of the acetic acid groups are replaced by a hydroxyethyl group. It is understood that the propionic acid analogues are also useful.

Perhaps the versatility of these reaction products is derived from the fact that cyanamide is the precursor of a variety of hydrolysis products as indicated in the voluminous literature involving the reactions and condensation products of cyanamide. For example, cyanamide in reaction with ammonium hydroxide produces guanide salts. It produces guanylureas; and with reaction with halogens and cyanocarboxylic acids and nitriles develops further compositions as well. (Detailed reactions of cyanamide as a chemical compound are to be found set forth in the bulletin "Cyanimide"

published by the American Cyanamide Company, Wayne, N.J., which bulletin is fully incorporated herein. Copy made a part hereof.)

Fundamentally, the cyanamide molecule is a quite reactive compound and it and its variants form an excellent reaction material for combination with the polyaminopolycarboxylic acid compounds to develop the novel —CONHX— proton donor group which I find so useful in chelation compositions. In view of the versatility of the cyanamide reaction, it is not possible to state the reaction in full in all its possible ramifications. Thus;

$$\begin{array}{c} HOOCCH_2 \\ \diagdown \\ N-CH_2CH_2-N \\ \diagup \\ HOOCCH_2 \end{array} \begin{array}{c} CH_2COOH \\ \diagup \\ \diagdown \\ CH_2COOH \end{array} + NH_2CN$$

$$\downarrow$$

$$\begin{array}{c} HOOCCH_2 \\ \diagdown \\ N-CH_2CH_2-N \\ \diagup \\ HOOCCN_2 \end{array} \begin{array}{c} CH_2COHNCN \\ \diagup \\ \diagdown \\ CH_2COOH \end{array} + H_2O$$

is perhaps the simplest formula for the first reaction product which can be written for 1 mol of cyanamide reacting with one mol of ethylenediamine tetraacetic acid.

However, it is possible to illustrate the course of the reaction through examples and through some illustrations of chelation of iron with the reaction product.

In the following, I have illustrated some typical examples of the preparation of the reaction products corresponding to this invention.

Example I

Na₂EDTA (disodiumethylenediaminetetraacetic
acid), 1/10 mol _____grams__ 37.5
Dicyandiamide, 2 equivalents, (M.W. 84) __do_____ 18
Water _____cc__ 150

Reflux with good agitation for a period of three hours. Cool. On cooling, long rod-like crystals form. This is unreacted dicyandiamide, calculated to be about ¼ of amount added.

Reheat the entire composition, but now concentrate by means of vacuum to about ½ volume. Crystals form during this reaction. They are not rod-like, but well-formed individual crystals, and do not cake. Cool and filter. 58 grams of crystals are filtered off. Concentrate mother liquor and harvest another 8 grams.

At this point, empirical test was made using 2 grams of the crystals and 0.6 gram of the $Fe^{3+}$ nitrate·9H₂O in 25 milliliters of water, at ambient pH 5. The chelate is yellow; it turns red at pH 10+ and is stable at this concentration, but not stable when diluted.

This material is then subjected to azeotropic distillation using toluene to form the azeotrope. Water comes off and ammonia is noticed. The final product is a dry non-hygroscopic white powder weighing 42 grams. Empirically, 2 grams will chelate 1 gram of $Fe^{3+}$ nitrate·9H₂O, giving a red solution in 25 milliliters of water at ambient pH 5; very deep red solution at pH solution 10+. This chelate is stable to boiling and to dilution.

Example II

EDTA (acid) _____grams__ 30
Dicyandiamide _____do____ 18
Ammonium hydroxide (conc. 26%) ___milliliters__ 20
Water _____do____ 100

React as in Example I. Reflux for two hours with intermittent cooling. Apply aspirator vacuum, at first low, to remove excess NH₃ and some water. Then concentrate as vacuum will permit (there is some foaming). The final product of this phase of reaction is a semi-dry product weighing 53 grams. This, too, will buffer $Fe^{3+}$ ions as a deep red solution when concentrated, but precipitates about ¼ of the $Fe^{3+}$ present in the form of $Fe(OH)_3$ when diluted. Then subject the entire mass to azeotropic distillation using toluene, removing water and NH₃. The final product is a white powder, non-hygroscopic, weighing 42 grams. This product chelates $Fe^{3+}$ at ambient pH 5, yellowish to red; deep-red at pH 11+, and stable to heat and dilution.

Example III

EDTA _____grams__ 30
Dicyandiamide _____do____ 18
Water _____milliliters__ 100

This slurry is solubilized using HCl—40 milliliters of commercial HCl solution. The reacting EDTA is, therefore, in the form of its hydrochloride. The reaction conditions are the same as in Examples I and II. The final product of condensation is a white granular powder, weighing 40 grams. The ambient pH is 4. The iron chelate is yellow at this pH, and deep-red at pH 11+.

Example IV

Using what may be considered excess dicyandiamide

EDTA _____grams__ 15
Dicyandiamide _____do____ 18
Water _____milliliters__ 100
NH₄OH (conc. 26%) _____do____ 20

The clear solution is refluxed for two hours with agitation. Then water and NH₃ are distilled off to a concentration weight of 59 grams. An empirical test shows this composition to be a good sequestrant for iron. The complex is deep-red at pH 11+, but the solution will precipitate iron upon dilution. The mass is now distilled using benzene to form the azeotrope. The final product obtained is a white non-hygroscopic powder, weighing 26 grams. The $Fe^{3+}$ chelate is stable at pH 11+; it may be boiled or greatly diluted without ferric hydroxide precipitating.

Example V

NTA (nitrilotriacetic acid) _____grams__ 20
Dicyandiamide _____do____ 10
Ammonium hydroxide (conc. 26%) ____milliliters__ 25
Water _____do____ 50

Reflux and agitate for a period of one hour. Then apply vacuum; concentrate to a slurry, about ⅓ in volume. Then azeotrope, using benzone. This composition is quite sensitive to high temperature. If toluene is used to form an azeotrope (distillation about 108 to 110° C.), a resin is formed, which, when refluxed in methanol gives a white amorphous powder. This powder, when dissolved in water, forms a quite viscous solution. This solution will coagulate metallic ions including $Fe^{3+}$ ions. This will not happen when benzene is used.

The iron chelate of NTA condensation product is also deep-red at pH of 10+, but will precipitate to some extent when diluted.

HEDTA (hydroxyethylethylenediaminetriacetic acid). This compound dissolves readily in hot water; in fact, it will dissolve in its own weight of water. It is believed that a lactone is formed under these conditions.

Example VI

HEDTA _____grams__ 14
Water _____milliliters__ 14
Dicyandiamide _____grams__ 8

Heat HEDTA and water in an open vessel with good agitation. As soon as the solution is formed, add the dicyandiamide. Permit evaporation to a final weight of 19 grams. This is an opaque resin. 2 grams of this resin will chelate 0.5 gram of ferric nitrate·9H₂O to a pH of 10.5. The color is red. It is stable.

Example VII

A second experiment was made using the same amounts of HEDTA and dicyandiamide, but adding 10 milliliters of NH₄OH and heating under reflux for one hour, then vacuum to a white semisolid paste. Triturate with menthanol. A white solid is obtained weighing 17 grams. This product chelates iron ions to a pH of 11+; is stable to boil and dilution.

Example VIII

Diethylenetriaminepentaacetic acid (DETPA): This compound, too, dissolves readily in hot water and is reacted in concentrated solutions as per Example VI or VII (HEDTA).

Na₃DETPA (trisodium diethylene
  triaminepentaccetic acid) _____ grams__ 21
Dicyandiamide _____ do____ 10
Water _____ milliliters__ 60

Reflux for a period of two hours. Then apply vacuum, and concentrate to a total weight of 34 grams. Then use toluene to form an azeotrope to remove the last of the water. The final condensate is a white granular powder weighing 27 grams. The iron chelate is red at pH of 11+, and stable to boiling and dilution.

A test was made using imino diacetic acid. This compound is not a chelating agent, per se for the ions of the transition series of metals. It was of interest to see if such a compound, when reacted with hydro nitrogen compound, would form substituted imino carboxymethyl derivatives and would become good sequestering agents for the above-named elements. Indeed this is the case.

Example IX

Imino diacetic acid (M.W. 133) _____ grams__ 14
Dicyandiamide _____ do____ 18
NH₄OH (conc. 26%) _____ milliliters__ 20
Water _____ do____ 50

Reflux for a period of two hours. Then apply vacuum and concentrate to about ⅓ of volume. Then use toluene to form the azeotrope for water removal.

The final product is a soft yellow semi-crystalline product weighting 27 grams. It is a good sequestrant for $Fe^{3+}$ ions. The chelate is a dark-red at pH of 11+.

It was of interest also to react the nitrile of EDTA with dicyandiamide.

Reactions with nitriles are described in the Cyanamide Bulletin, page 10; also Zerweck and Burnner, U.S. Patent No. 2,302,162 (1942).

The reaction was carried out as follows:

EDTA nitrile (M.W. 226) _____ grams__ 22
Dicyandiamide _____ do____ 18
NaOH _____ do____ 8
Water _____ milliliters__ 150

The white slurry becomes a clear solution after about one hour at reflux; well agitated. Then the solution turns red. NH₃ is very noticeable. Reflux for three hours. Then apply vacuum and concentrate to ½ volume. This solution is dark red. The color cannot be discharged using charcoal.

Repeat experiment without additional base.

Example X

EDTA nitrile _____ grams__ 11
Dicyandiamide _____ do____ 8
Water _____ milliliters__ 80

Reflux and agitate. Surprisingly, this composition forms a clear solution within 1½ hours. Then crystals begin to form. Vacuum and concentrate to about ½ volume. Crystals form on boiling. Filter and wash with methanol; 16 grams of white crystals are obtained. They do not chelate metal ions but are precipitants for metallic ions.

In recapitulation, therefore, inspection of the examples and the general description of the reaction will indicate that apparently a reaction between the cyanamide and the chelating acid occurs which is characterized by releasing water. Hence, conditions for the reaction should be such that a dehydrating effect will be obtained. As the examples show, the presence of water during the reaction can be tolerated, but as the reaction proceeds, it is removed. This is done by carrying out the reaction at essentially boiling temperature. A fusion is a possible and useful method, but it can lead to the partial decomposition of product by development of too high temperatures. In proportioning the reactants, one mol of cyanamid, one mol of dicyandiamide, or one mol of melamine can be used per mol of acetic or propionic acid moiety in the chelating acid. Thus, generally, enough of the cyanamide is used to make at least a mono substituted product, but, generally, I find that a di-substituted product is preferable and to carry the reaction to the limit of reactability of the chelating acid moiety with the cyanamide moiety. It should be noted, also, that the esters of the chelating acids are useful as starting reactants. This includes the full esters, or the partial esters, in mixtures, because as reactants, the esters seem to have labile hydrogen which permits formation of the —CONHX— moiety in reaction with cyanamide.

Thus, for example, with ethylenediaminetetetraacetic acid, it is possible to use as a starting material a mono, di, tri, or tetra ester of methyl, ethyl, or propyl, etc., alcohol. Generally, a tetra-ester is preferred. In the reaction, the simple ester such as the methyl, ethyl, or propyl ester, hydrolyzes and the reaction of the acetic acid moiety, probably in lactone or anhydride form, is possible to form a —CONHX—, which I find so useful as a reagent for chelation purposes. The particular ester which is used is not important. Generally, the lower alkyl ester hydrolyze readily and the alcohol formed as a by-product is easily removed. Thus, for example:

⅒ mol of the mixed ethyl ester of ethylenediaminetetraacetic acid (i.e., di, tri, tetra) is reacted with 5/10 mol of cyanamide to completion of the reaction, After removal of the alcohol and the water the residue is a viscous, non-crystallizing mass. It is water soluble and functions efficiently as a chelating agent for iron.

Similar results are obtained using methyl, propyl esters and mixtures of esters from the mono to and through full esterification of the starting acid. Likewise, similar results are obtained using imino diacetic acid, nitrilo triacetic acid, diethylenetriaminepentaacetic acid and others of higher molecular weight of the sequence of chelating acids.

What is claimed is:
1. The reaction product of a cyanamide compound and an amino polycarboxylic compound corresponding to the following formula:

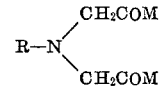

wherein R is selected from the group consisting of hydrogen and

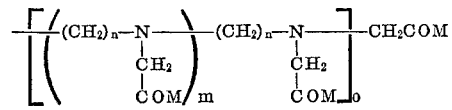

in which:
$m = 0-4$
$o = 0, 1$
$n = 2, 3$ and COM is independently selected from the group consisting of —COOH, —COONa, —COOK, —COONH₄ and —COO alkyl, not more than two COM's being —CH₂OH and the starting acid compound has at least two moieties available for reaction with the cyanamide compound, the reaction product being that formed under conditions of temperature such that water is eliminated with acidic starting compound and alcohol is eliminated with ester starting compound.

2. The reaction product, in accordance with claim 1, formed by reaction between ethylenediaminetetraacetic acid compound and dicyandiamide in the proportion of about 2 mols of dicyandiamide per mol of ethylendiaminetetraacetic acid.

3. The reaction product, is accordance with claim 1, formed by reaction between ethylenediaminetetraacetic acid and dicyandiamide in the proportion of about one mol of dicyandiamide per mol of ethylenediaminetetraacetic acid.

4. The reaction product, in accordance with claim 1, formed by the reaction of nitroltriacetic acid with dicyandiamide in the ratio of one mol of dicyandiamide per mol of nitroltriacetic acid.

5. The product of reaction, in accordance with claim 1, between hydroxyethylethylenediaminetriacetic acid and dicyandiamide, wherein the amount of cyanimide is in the range from one mol to three mols per mol of starting acid.

6. The product of reaction, in accordance with claim 1, between diethylenetriamine pentacetic acid and dicyandiamide, wherein the amount of cyanamide is in the range from one mol to five mols per mol of starting acid.

References Cited

UNITED STATES PATENTS 2,805,203   9/1957   Knapp _____ 260—534 XR

FOREIGN PATENTS 781,491   8/1957   Great Britain.
836,332   6/1960   Great Britain.

LORRAINE A. WEINBERGER, *Primary Examiner.*

A. P. HALLUIN, *Assistant Examiner.*

U.S. Cl. X.R.

71—112, 113; 260—439, 482, 561